United States Patent [19]

Itoh et al.

[11] Patent Number: 4,606,945

[45] Date of Patent: Aug. 19, 1986

[54] RUST PREVENTING WAX TREATMENT METHOD

[75] Inventors: Haruhiro Itoh; Masashi Ohno; Tadahiko Morigaki, all of Hatano; Kiminori Ishii, Ebina, all of Japan

[73] Assignee: Nissan Motor Co., Ltd., Yokohama, Japan

[21] Appl. No.: 781,648

[22] Filed: Sep. 30, 1985

[30] Foreign Application Priority Data

Oct. 26, 1984 [JP] Japan ................................ 59-224043

[51] Int. Cl.[4] ........................... B05D 3/02; C04B 9/02; C09G 1/08

[52] U.S. Cl. ....................................... 427/318; 106/10; 106/14.34; 427/374.1; 428/484

[58] Field of Search ................................ 106/270–272, 106/14.34, 10; 252/388; 428/484; 427/133, 135, 318, 374.1

[56] References Cited

U.S. PATENT DOCUMENTS 3,393,078 7/1968 Lockhart et al. ................. 106/10 X 4,479,981 10/1984 Winters et al. .............. 106/14.34 X

*Primary Examiner*—Michael R. Lusignan

*Attorney, Agent, or Firm*—Schwartz, Jeffery, Schwaab, Mack, Blumenthal & Evans

[57] ABSTRACT

In a rust preventing wax treatment method which is applicable to automobile bodies already provided with a finish coat of paint, use is made of a wax which possesses not only thixotropy but also such a temperature-sensitive property that the viscosity of the wax decreases when heated and increases again when cooled near to room temperature. In the wax treatment method the wax and/or the article to be treated with the wax is heated and the wax, which is kept under action of a mechanical force to utilize its thixotropy, is applied to desired surfaces of the article. After that the waxed article is cooled near to room temperature. By this method the wax exhibits a very low viscosity when applied to the article and therefore can penetrate even into narrow spaces, and the applied wax soon solidifies as the waxed article is cooled. Therefore, a wax coating film of a sufficient thickness can be formed without suffering from dripping of the applied wax.

7 Claims, 6 Drawing Figures

RUST PREVENTING WAX TREATMENT METHOD

BACKGROUND OF THE INVENTION

This invention relates to a method of giving a rust preventing wax treatment to an article, such as an automobile body for example.

A rust preventing wax treatment is given to many kinds of industrially produced articles.

In the automobile industry it is usual to make a rust preventing wax treatment of automobile bodies which are already provided with a finish coat. In this treatment a wax is applied to selected parts of the car body such as side members, inner surfaces of the engine room hood and the trunk lid and inboard surfaces of doors. It is desired to form a wax coating film of a predetermined thickness on every area of the surfaces subjected to treatment, and the wax must penetrate into narrow spaces that exist, for example, in joint regions and panel turnup regions of each car body. The penetration of the wax into narrow spaces is facilitated if the wax exhibits a very low viscosity. However, when such a low viscosity wax is used it is difficult to form a wax coating film of a desired thickness on every area, and the wax applied to upright or steeply slant surfaces continues to drip down even after completion of the wax treatment operation. Such dripping of the wax often causes soiling of the treated automobile bodies or the subsequent station of the production line. If it is intended to obviate such disadvantages by using a wax having a sufficiently high viscosity, the wax fails to penetrate into narrow spaces so that the rust preventing treatment remains incomplete.

With a view to realizing good penetration of a wax into narrow spaces in the object of wax treatment without suffering from dripping of the applied wax, it is known to utilize a thixotropic property which some kinds of waxes possess. When a wax possesses a thixotropic property, the viscosity of the wax becomes relatively low while the wax is in motion by the effect of an externally supplied mechanical energy and reverts to a relatively high level as the wax resumes static state. However, the waxes used in conventional rust preventing treatments are not sufficiently high in the degree of thixotropy. Therefore, it is usual to use a wax composition of either a solvent-thinned type or an aqueous dispersion type in which the content of the organic solvent or water is relatively large. By using such a liquid wax composition which is sufficiently low in viscosity good penetration of the wax into narrow spaces is achieved. However, solidification of the applied wax by evaporation of the solvent takes a considerable time, so that the wax applied to upright or steeply slant surfaces often drips down before sufficiently increasing viscosity. That is, difficulties in forming a wax coating film of a desired thickness and the likelihood of soiling of the treated automobile bodies or the subsequent operation station are still remaining as unsolved problems.

SUMMARY OF THE INVENTION

It is an object of the present invention to provide an improved rust preventing wax treatment method, which is applicable to wax treatment of automobile bodies and by which a good wax coating film of a desired thickness can surely be formed even though the object of wax treatment includes narrow spaces without suffering from dripping of the applied wax.

According to the invention, use is made of a wax which possesses thixotropy and such a temperature-sensitive property that the viscosity of the wax decreases when heated and increases again when cooled near to room temperature. A rust preventing wax treatment method according to the invention comprises the steps of (a) heating either of, or both of, the wax and an article to be treated with the wax, (b) keeping the wax under action of a mechanical force and, after the step (a), applying the wax to desired surfaces of the article, and (c) after the step (b) cooling the article near to room temperature at least in the aforementioned surfaces.

The wax used in this invention is a composition comprising a microcrystalline wax and at least one kind of rust preventing additive as essential ingredients. Usually the wax composition is either a solution in an organic solvent or a dispersion in water. A practically convenient manner of applying a mechanical force to the wax is pressurizing the wax to force it flow through a pipe connected to a spray gun.

By the joint effects of the thixotropy of the wax and the aforementioned dependence of the viscosity of the wax on temperature, the wax exhibits a very low viscosity and therefore can penetrate into narrow spaces when applied to the object of wax treatment even though the content of the solvent or water in the wax composition is relatively small, and the applied wax solidifies in a short time as the waxed article is cooled near to room temperature. Accordingly a wax coating film of a desired thickness can surely and easily be formed without suffering from dripping of the applied wax.

DETAILED DESCRIPTION OF THE INVENTION

The wax treatment method according to the invention uses a wax that possesses thixotropy, and in this method a mechanical force is externally applied to the wax to keep the wax in motion before applying the wax to the surfaces to be treated. In practice it is usual to pressurize the wax and force it to flow through a pipe which extends to a spray gun at a sufficiently high speed. Due to its thixotropy the wax flowing in the pipe undergoes considerable lowering of viscosity and is sprayed on the intended surfaces in the viscosity reduced state. Therefore, the wax can penetrate into narrow gaps which may possibly be present along or in front of some areas of the surfaces. After the application of the wax by such a method no external force acts on the applied wax, so that the viscosity of the wax spontaneously increases by the effect of thixotropy. Accordingly dripping of the applied wax is suppressed, and a wax coating film of an appropriate thickness can easily be formed.

Figure 1:
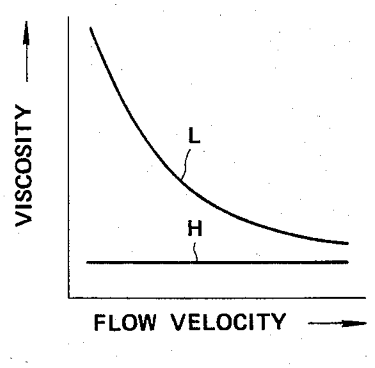
FIG. 1 is a graph explanatorily showing the dependence of the thixotropy of a wax used in this invention on temperature.

In this invention it is preferred to use a wax which exhibits a high degree of thixotropy at temperatures around room temperature and becomes low in thixotropy at elevated temperatures. FIG. 1 illustrates the thixotropic properties of such a wax. As represented by the curve L, when the wax is kept at or around room temperature and is flowing under pressure in a pipe the viscosity of the wax is considerably high while the velocity of the flow is low and becomes lower and lower as the velocity becomes higher. At elevated temperatures, e.g. at a temperature above 50° C., the viscosity of the flowing wax is almost independent of the flow velocity, as represented by the curve H, and remains at a very low level.

Figure 2:
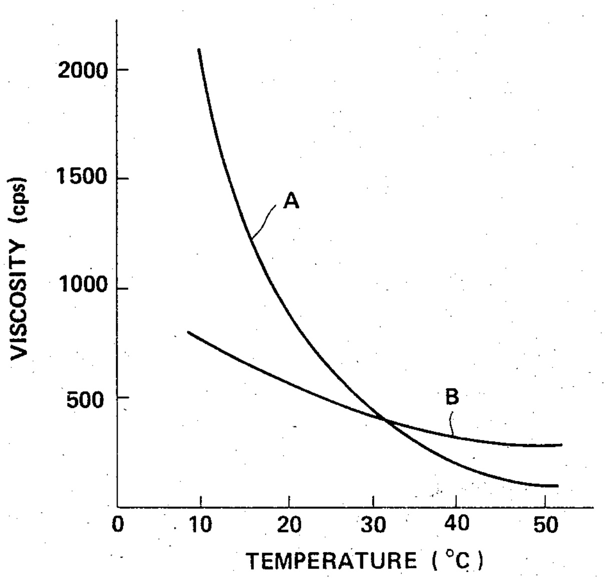
FIG. 2 is a graph showing the manner of a change in the viscosity of a wax used in this invention upon rapid reduction of temperature from 50° C. in comparison with another wax not useful for the invention.

The viscosity of a wax used in this invention is affected by temperature too. In FIG. 2, the curve A represents an example of waxes useful in this invention. When the wax is heated to about 50° C. the viscosity becomes very low, and when the wax is rapidly cooled from that temperature to near room temperature the viscosity increases steeply. For comparison, the curve B in FIG. 2 represents a typical example of conventional waxes used in the automobile industry. To utilize the temperature-viscosity relationship represented by the curve A, the wax treatment method of the invention includes the step of heating the wax upon or before contact of the wax with a surface to be treated and also the step of cooling the applied wax to room temperature or near thereto.

Figure 3:
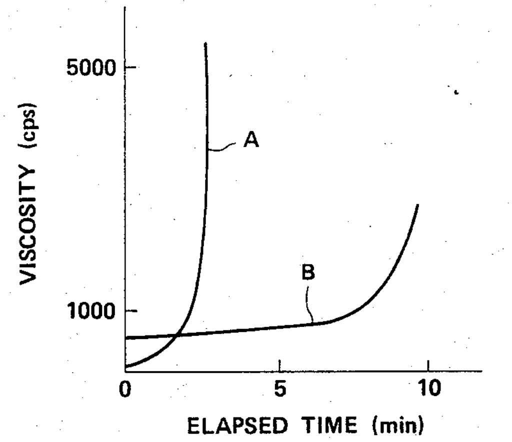
FIG. 3 is a graph showing the manner of a change in the viscosity of a wax applied to a metal surface by a method of the invention with the lapse of time in comparison with another wax applied to the same surface by a conventional method.

In the method of the invention the wax applied to the intended surfaces solidifies in a short time, as represented by the curve A in FIG. 3, by the joint effects of the thixotropy and the dependence of viscosity on temperature. For comparison, the curve B in FIG. 3 represents a conventional wax used in a conventional method.

A wax used in this invention is a composition which always comprises a microcrystalline wax and sometimes comprises a modified wax such as oxidized wax too. The wax composition contains usual additives for rust preventing and other purposes, and the wax composition is in the form of either a solution in an organic solvent or an aqueous dispersion. Some examples of preferred wax compositions are shown below. The amounts of the materials are given by parts by weight.

EXAMPLE 1

| | |
|---|---|
| Microcrystalline wax (m.p. 70° C.) | 27 parts (variable: 5-40 parts) |
| Ultrabasic sulfonate | 12 parts (variable: 5-40 parts) |
| Petroleum sulfonate | 3 parts (variable: 1-20 parts) |
| Mineral spirit (flash point 30° C.) | 58 parts (variable: balance) |
| Total | 100 parts |

EXAMPLE 2

| | |
|---|---|
| Microcrystalline wax | 20 parts (variable: 5-40 parts) |
| Petrolatum oxide (acid value 30-35) | 7 parts (variable: 1-20 parts) |
| Ultrabasic sulfonate | 15 parts (variable: 10-50 parts) |
| Mineral spirit | 58 parts (variable: balance) |
| Total | 100 parts |

EXAMPLE 3

| | |
|---|---|
| Oxidized wax (acid value 6) | 20 parts |
| Microcrystalline wax | 8 parts |
| N,N—diethylethanolamine | 3 parts |
| Copolymer of acrylate and vinyl acetate | 2 parts |
| Synthetic fatty acid | 0.7 part |
| Water | 66.3 parts |
| Total | 100 parts |

EXAMPLE 4

| | |
|---|---|
| Oxidized wax (acid value 50) | 15 parts |
| Microcrystalline wax | 8 parts |
| N,N—diethylethanolamine | 1.5 parts |
| Dimethylstearylamine | 2 parts |
| Calcium sulfonate | 3.5 parts |
| Copolymer of acrylate and vinyl acetate | 5 parts |
| Polybutene | 10 parts |
| Water | 55 parts |
| Total | 100 parts |

EXAMPLE 5

| | |
|---|---|
| Oxidized wax (acid value 32) | 30 parts |
| Microcrystalline wax | 10 parts |
| N,N—diethylethanolamine | 4 parts |
| Copolymer of acrylate and vinyl acetate | 5 parts |
| Sodium salt of poly(maleated isobutylene) | 0.5 part |
| Oil | 5 parts |
| Water | 45.5 parts |
| Total | 100 parts |

Figure 4:
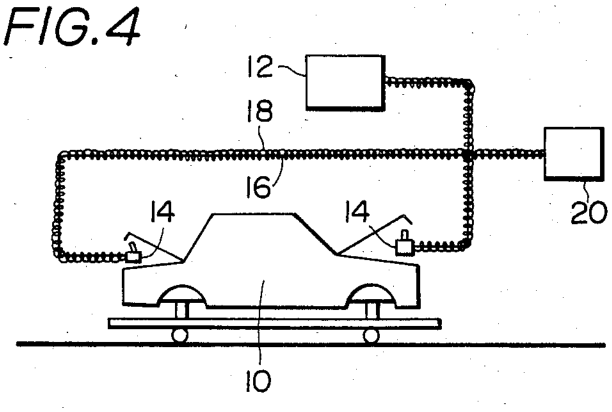
FIGS. 4 to 6 are schematic illustrations, respectively, of three kinds of heating methods which are selectively employable in applying a wax to an automobile body by a method of the invention.
Figure 5:
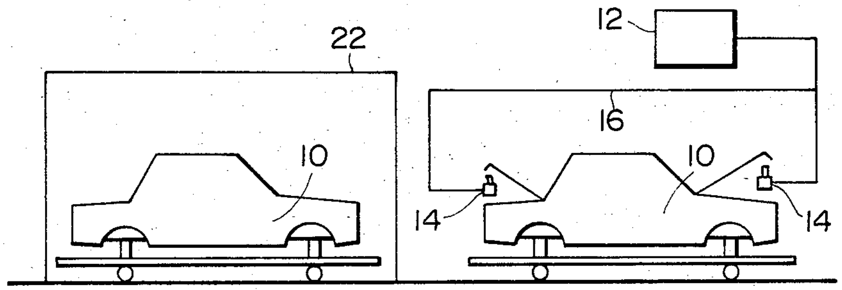
Figure 6:
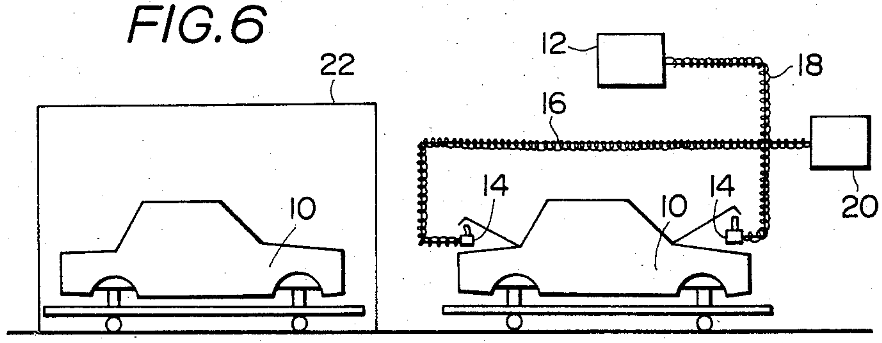

Practical manners of heating a wax in the wax treatment method of the invention are illustrated in FIGS. 4, 5 and 6, wherein an automobile body 10 is the object of wax treatment. The automobile body 10 is already provided with a finish coat of paint.

FIG. 4 illustrates a first case where a wax in heated state is applied to the automobile body 10 which is left at room temperature. Numeral 12 indicates a tank containing the wax. The wax is pressurized and is supplied to spray guns 14 through pipes 16. For heating the wax before spraying a heater 18 is coiled around the pipe 16 connecting each spray gun 14 to the wax tank 12. The heaters 18 are electrically connected to a controllable power supply 20.

FIG. 5 illustrates a second case where the automobile body 10 is heated in advance of wax treatment in an oven 22 which is located shortly precedent to the wax treatment station. In this case the pipes 16 extending from the wax tank 12 to the spray guns 14 are not provided with any heating means. Soon after heating the automobile body 10 is transferred to the wax treatment station, where the wax under pressure is sprayed on the heated automobile body 10. As a natural consequence the wax is heated upon deposition on the automobile body 10.

FIG. 6 illustrates a third case where both the wax and the automobile body 10 are heated before applying the wax to the automobile body 10. The pipes 16 extending from the wax tank 12 to the spray guns 14 are provided with the heating means 18 and 20 in the same manner as in the case of FIG. 4, and the automobile body 10 is heated in the oven 22 just before wax treatment in the same manner as in the case of FIG. 5.

An arbitrary selection can be made among these three kinds of heating methods according to the particulars of the article to be treated with wax. In every case the heating of the wax and/or the article to be waxed is performed such that the wax deposited on the intended surfaces of that article has a sufficiently high temperature, e.g. 50° C. or above when the temperature-viscosity characteristic of the wax is as represented by the curve A in FIG. 2, and therefore exhibits a sufficiently low viscosity. Accordingly the wax surely penetrates into narrow spaces and the like which may be included in the object of wax treatment.

After application of the wax by spraying, the waxed article is left standing at room temperature to allow the wax coating film to cool down. If necessary the waxed article may be transferred into a cooled zone. As the temperature lowers the viscosity of the applied wax increases to a level sufficient for retention of a desired thickness of the wax coating film even on a vertical surface, so that dripping of the applied wax is suppressed.

What is claimed is:

1. A method of giving a rust preventing wax treatment to an article, the method comprising the steps of:

(a) heating at least one of (i) a wax which possesses thixotropy and such a temperature-sensitive property that the viscosity of the wax decreases when heated and increases again when cooled near to room temperature and (ii) an article to be treated with the wax;

(b) keeping said wax under action of a mechanical force and, after step (a), applying said wax to desired surfaces of said article; and (c) after step (b) cooling said article near to room temperature at least in said surfaces.

2. A method according to claim 1, wherein said wax is a composition comprising a microcrystalline wax and at least one kind of rust preventing additive.

3. A method according to claim 2, wherein said composition is in the form of a solution in an organic solvent.

4. A method according to claim 2, wherein said composition is in the form of a dispersion in water.

5. A method according to claim 1, wherein at least one of said wax and said article is heated to a temperature not lower than 50° C. at step (a).

6. A method according to claim 1, wherein said wax is pressurized and forced to flow through a pipe at step (b).

7. A method according to claim 1, wherein said article is an automobile body which is provided with a finish coat of paint.

* * * * *